Patented July 6, 1937

2,086,458

UNITED STATES PATENT OFFICE 2,086,458

POLYHYDRIC ALCOHOL-POLYBASIC ACID RESINS

Roger Adams, Urbana, Ill., assignor to E. I. du Pont de Nemours & Company, Wilmington, Del., a corporation of Delaware No Drawing. Application March 16, 1932
Serial No. 599,362

11 Claims. (Cl. 260—2)

This invention relates to aliphatic esters of hydrogenated acidic gums, and more particularly to esters of polyhydric alcohols with a mixture of organic acids, one of which is a hydrogenated acidic gum, and to compositions comprising these esters.

This invention has as an object the improvement of resinous esters made from natural acidic gums without sacrificing certain advantages which attend the use of these substances. A further object is the production of these esters in the form of polyhydric alcohol-polybasic acid resins modified with hydrogenated acidic gums. A still further object resides in the production of an improved composition from these esters, particularly coating compositions of valuable film characteristics. Other objects will appear hereinafter.

By the term "hydrogenated acidic gum" as used herein I mean an acidic natural gum which has been subjected to hydrogenation. The ability of the gum to be hydrogenated is generally supposed to be due to chemical unsaturation. However, the chemical nature of these gums is not well understood. It may be that the unsaturation is present as ethylinic linkages, bridged rings, or in some form which is more or less difficult to detect, as by iodine number. The fact remains that the natural gum can be hydrogenated and esterified, or esterified and hydrogenated, and applied in an advantageous manner for the purposes of this invention. Therefore, for the purposes of this invention, hydrogenated gums are considered in the claims to be included in the term "hydrogenated acidic gum." Examples of the gums which can be hydrogenated are rosin, kauri, Manilla, Congo, Sandarac, damar, Pontianac, Sierra Leone, Zanzibar, or mixtures thereof.

The hydrogenated acidic gum or gum derivative may be prepared by any well known method, such as by hydrogenation under varying pressures and temperatures in the presence of such catalysts as nickel, platinum, or palladium. Frequently the hydrogenation is effected in a solvent, such as benzene. In many cases I may use in my esters materials which have been separated from the crude gum and then hydrogenated, such as hydrogenated abietic acid. Conversely, the hydrogenated abietic acid may be separated from hydrogenated rosin. It is to be understood that the term "acidic gum" is for convenience used in the claims to designate either the gum itself or the resin acid derived therefrom.

The following examples are illustrative of the methods used in carrying out my invention:

Example I

This example illustrates the preparation of a monohydric alcohol ester of a hydrogenated acidic gum.

The charge consists of:

| | Parts by weight |
|---|---|
| Ethyl abietate | 300 |
| Nickel (supported on kieselguhr) | 15 |

The charge was heated at 150° C. under a hydrogen pressure of 1000–1200 pounds for 1.5 hours. Hydrogen absorption began at 100° C. and proceeded rapidly. Heating and agitation were continued until the cessation of gas fixation. After removal of the catalyst the product was of a medium amber color, not greatly unlike the original ethyl abietate in appearance.

Hydrogenated ethyl abietate may also be obtained by treating an alkali salt of hydrogenated abietic acid with an ethyl halide. Hydrogenated butyl abietate may be obtained in an analogous manner or, as above, by hydrogenating the preformed butyl abietate. Similarly, hydrogenated resin acid esters of ether alcohols such as ethoxyethanol, methoxypropanol, dibenzylin, dibutylin, diethylin, monoethyl ether of diethylene glycol may be prepared in the above ways.

Example II

This example illustrates the preparation of a simple polyhydric alcohol ester of a hydrogenated acidic gum.

The charge consists of:

| | Parts by weight |
|---|---|
| Crude ester gum | 5400 |
| Ni (supported on kieselguhr) | 150 |

The ester gum was melted at a temperature of 175–225° C. in a two gallon autoclave, and the catalyst added while the gum was in the liquid state by stirring in under an atmosphere of carbon dioxide. Under a hydrogen pressure of 800–1000 pounds hydrogen fixation began at about 140° C. and proceeded rapidly for about 1½ hours. The final product after removal of the catalyst was a hard, brittle, dark amber colored material.

The hydrogenated ester gum above may also be obtained by heating hydrogenated abietic acid with glycerol.

Esters of hydrogenated acidic gums with polyhydric ether alcohols such as monoethylin, monobenzylin, ethyl ether of sorbitol, butyl ether of pentaerythritol, methyl ethers of inositol, etc. may be prepared by either method.

These simple esters of hydrogenated acidic gums with either monohydric or polyhydric alcohols (as hydrogenated ethyl abietate and hydrogenated ester gum) can be obtained with equal facility in one of two analogous ways. Thus, hydrogenated ester gum may be prepared by either heating hydrogenated rosin with glycerol or by hydrogenating the condensation product of rosin and glycerol (Example II); hydrogenated ethyl abietate can be obtained by hydrogenating the previously prepared ethyl abietate (Example I) or from hydrogenated rosin in any one of the known ways which is applicable to unhydrogenated rosin, such as by heating an alkali salt with an ethyl halide.

While the simple esters of the type referred to in Examples I and II possess advantages not present in the corresponding unhydrogenated product, the preferred derivatives are found in the mixed esters in which a polyhydric alcohol is esterified by one or more organic acids in addition to the hydrogenated acidic gum. The following are examples of the preparation of such mixed esters:

Example III

| | Parts by weight |
|---|---|
| Glycerol | 43.5 |
| Hydrogenated abietic acid | 157.7 |
| Linseed oil acids | 298.8 |

All the ingredients are fused simultaneously in a vessel fitted with a stirrer and a short air-cooled reflux condenser. The temperature is brought to 225° C. over a period of ½ hour and maintained at this point for 8½ hours.

This ester is a dark brown viscous liquid of acid number 11.5. It is soluble in esters, aromatic hydrocarbons and alcohol hydrocarbon mixtures.

Among the most valuable of the mixed esters of the present invention are those produced by esterifying a polyhydric alcohol with a hydrogenated acidic gum and a polybasic acid. Mixed esters of this type, which may be termed a hydrogenated acidic gum modified polyhydric alcohol-polybasic acid resin, may be made according to the following procedure wherein a previously hydrogenated ester gum is used:

Example IV

One hundred thirty-one and three-tenths (131.3) parts phthalic anhydride, 99.0 parts hydrogenated ester gum, and 69.7 parts glycerol are weighed into an open aluminum vessel and brought to a temperature of 205–215° C. over a period of 1¾ hours, with continual stirring. This rather long preliminary period of heating is desirable because of the tendency of the mixture to foam in the early stages of the reaction. The temperature of 215° C. is maintained for an additional 1¼ hours, after which period the heat is removed and the resin thinned with an equal weight of hi-flash naphtha, after first being allowed to cool to about 175° C. A small sample withdrawn before thinning showed an acid number of 38, and was about the color and consistency of rosin.

The hydrogenated acidic gum modified polyhydric alcohol-polybasic acid resin may be improved for many purposes by the incorporation of a drying oil or of a drying oil acid, as in the following example:

Example V

One hundred eighty-three and two-tenths (183.2) parts glycerol, 180.2 parts hydrogenated abietic acid, 312.8 parts linseed oil acids, and 323.8 parts phthalic anhydride are heated with stirring in an open vessel to a temperature of 200° C. over a period of 1½ hours. Heating is continued at this point for about an hour longer, the temperature then being raised to 220° C. After four hours additional at this point, the acid number reaches 14.7, and heating is discontinued. The resin obtained shows a clear dark brown color, and is soft and slightly sticky. It is easily compatible with nitrocellulose, and therefore suitable for both clear varnishes and nitrocellulose lacquers or enamels.

If it is desirable to use a drying oil instead of the oil acids in making the above resins, the preferred procedure consists in preheating the glycerol with the drying oil, preferably in the presence of a catalyst such as litharge, sodium hydroxide, sodium alcoholates, barium oxide, calcium oxide, etc., and then heat-treating this product with the phthalic anhydride and hydrogenated abietic acid.

In preparing the mixed resinous esters referred to in Examples III to V, I may proceed in one of the two ways mentioned in connection with the simple esters, which may be illustrated by specific reference to the mixed glyceride of hydrogenated rosin, phthalic anhydride, and linseed oil acids of Example V. One method consists in fusing all these ingredients simultaneously and the other method consists in heating the unhydrogenated rosin with part or all of the glycerol, hydrogenating the glycerol ester formed, and heating this product with phthalic anhydride, linseed oil acids and any remaining glycerol. To illustrate these two methods, hydrogenated ester gum was used in Example IV and hydrogenated rosin in Example V.

When making my mixed esters by any of the various suitable methods, the ingredients are heated to any suitable temperature above their mixed melting point until resinification takes place. An atmosphere of an inert gas may be used to produce lighter colored products, and the process is materially speeded up by efficient agitation. It is desirable not to deviate too far from chemically equivalent proportions of the ingredients, though in some cases an excess of the polyhydric alcohol is desirable.

It is also desirable to carry the acid number as low as possible, while still maintaining the resinous ester in the fusible, soluble state. However, prolonged heating which produces only a small change in acid number is not desirable, as it tends to increase substantially the body of the product and to impart a high viscosity to its solutions. It is well known to those skilled in the manufacture of ester type resins that different types require different heat treatment. This is also true in the case of the mixed esters of hydrogenated acidic gums. Such factors as the quantity of oil, the nature of the oil and the method for its incorporation (as oil, oil acids, or preheated mixture of oil and polyhydric alcohol), as well as the presence of small amounts of monohydric alcohols, monobasic acids (other than resin acids), and excess polyhydric alcohol all present somewhat different requirements in heat treatment. In general, I carry the ingredients to a temperature of 200–250° C. over a period of one to two hours and continue the heat treatment in this range until an acid number is reached consistent with the optimum fusibility, solubility, and viscosity characteristics. This may be determined by withdrawing small test portions from time to time.

Two methods of esterification have been shown, the reaction of the alcohol with the acid and of an alkyl halide with the sodium salt. The esterification may also be effected by heating an alcohol with an ester of a lower boiling alcohol in the presence of suitable catalysts, e. g., sodium alcoholates, litharge, etc. until the higher boiling alcohol has practically completely displaced the more volatile alcohol which distills off.

There is no limiting percentage of hydrogenated acidic gum which may be employed in connection with remaining ingredients, but I prefer some quantity in the range of 10–65%. Obviously, different proportions of the treated gum require the proper adjustment of the alcoholic ingredients, as based on the combining weight of the gum which is shown by its acid number.

Various changes in the procedure of carrying out the process, such as the use of reduced or increased pressures, the use of catalysts such as sulfuric acid, p-toluene sulfonic acid, zinc chloride, etc., the use of vessels of different metal, such as iron, aluminum, or Monel, or the use of small amounts of holding agents, such as urea, to offset bodying and gelation, will readily occur to those skilled in the art of preparing synthetic resinous materials of the ester type. The hydrogenated rosin modified polyhydric alcohol-polybasic acid resins may be made by any of the methods known in the art of making these resins from polyhydric alcohols, polybasic acids, and unhydrogenated gums, with or without other modifying agents. Thus, in addition to the methods described, I may react the ingredients in solution of an inert solvent by heating the ingredients in the solvent until resinification takes place, provision being had for the removal of the water of reaction.

The simple monohydric alcohol esters of hydrogenated acidic gums may be prepared from any aliphatic alcohol, or derivative thereof which behaves chemically in the same fashion. It is preferred, however, to use alcohols containing a chain of at least two aliphatic carbon atoms directly attached to the hydroxyl. Aromatic groups separated from the hydroxyl by at least two aliphatic carbon atoms as in dibenzylin, benzyloxyethanol, phenoxyethanol, β-phenylethanol, cinnamyl alcohol, etc. may be used. Other monohydric alcohols which may be used are amyl, octadecyl, oleyl, dodecyl, tetrahydrofurfuryl, crotyl, cyclohexyl, methylcyclohexyl, etc. The simple polyhydric alcohol esters of hydrogenated acidic gums likewise may be made from any polyhydric alcohol or similar derivative thereof.

The mixed esters of hydrogenated acidic gums may also be made with any polyhydric alcohol (including polyhydric ether alcohols). In this case, however, the amount of the polyhydric alcohol as compared to the acidic gum is obviously greater than in the case of the simple polyhydric alcohol esters. To combine with the remaining hydroxyl group or groups of the polyhydric alcohol (that is to introduce the "mixed" element) monobasic acids and/or polybasic acids may be used. The monobasic acids may be aromatic acids, simple fatty acids, and fatty acids derived from the saponification of all kinds of fatty oils, or even unhydrogenated natural resinic acids.

Certain additional substances, such as monohydric alcohols and/or hydroxylated oils, are frequently desirable in the mixed esters for their softening action on the resinous products formed.

Among the polyhydric alcohols suitable for the practice of the present invention in the preparation of both simple and mixed esters of hydrogenated acidic gums are: glycerol, ethylene glycol and higher homologs, octadecanediol, diethylene glycol and other polyglycols, polyglycerols, triethanolamine, pentaerythritol, mono ethers and esters of glycerol, polyvinyl alcohol, or mixtures thereof. Practically any type of monocarboxylic acid may be used in making the mixed esters as will be apparent from the following list of suitable acids: butyric acid, lactic acid, benzoic acid, furoic acid, stearic acid, oleic acid, salicylic acid, naphthoic acid, coconut oil acids, China wood oil acids, linseed oil acids, castor oil acids, soya bean oil acids, cottonseed oil acids, or mixtures thereof; also unhydrogenated natural resinic acids, such as abietic acid. As examples of suitable polybasic acids or anhydrides that may be used with the hydrogenated acidic gums in esterifying polyhydric alcohols for the production of hydrogenated acidic gum modified polyhydric alcohol-polybasic acid resins may be cited: phthalic, succinic, adipic, sebacic, fumaric, itaconic, tartaric, citric, dilactylic, thiodilactylic, salicylacetic, chlorophthalic, diphenic, naphthalic, pyromellitic, quinolinic, tricarballylic, or mixtures thereof. In addition to the polybasic acid and hydrogenated acidic gum (or gums), any of the previously mentioned monobasic acids, particularly the fatty oil acids, may be used to make the polyhydric alcohol-polybasic acid resins having improved film-forming properties.

Where the term "acid" is used in the claims it is meant to include the anhydride as well as the acid.

Examples of monohydric alcohols that may be used as ingredients of my new resins for the purpose of softening them are: butyl alcohol, benzyl alcohol, oleyl alcohol, cetyl alcohol, and octadecyl alcohol. Hydroxylated oils, such as castor oil, may be used for the same purpose.

I believe the principle of my invention to be based upon the presence of chemical unsaturation in the natural acidic gum in the form of one or more ethylenic or other unsaturated linkages. The great majority of the natural acidic gums are unsaturated and, therefore, capable of hydrogenation and subsequent use as ingredients of the simple or mixed esters hereinbefore disclosed. As previously pointed out, certain gum derivatives, namely, those in which the ethylenic or other unsaturated linkage presumably remains intact, such as esters, are also suitable for hydrogenation, this being in fact one way of obtaining the ester of the hydrogenated acidic gum.

The esters of hydrogenated acidic gums of the present invention, and particularly the mixed resinous esters of the type disclosed in Examples III and IV, are valuable for the manufacture of improved coating compositions. By replacing natural acidic gums (such as rosin) with the hydrogenated gum in preparing the simple or mixed polyhydric alcohol esters, there has been obtained products the films of which show greater durability on outside exposure. This greater durability appears to be due to the less rapid absorption of oxygen in the hydrogenated product. At the same time desirable solubilities or the low viscosity characteristics of solutions of the resinous esters of unhydrogenated natural gums are not sacrificed.

The following is an example of a clear varnish:

*Example VI*

| | Parts by weight |
|---|---|
| Resin of Example V | 100.0 |
| Hi-flash naphtha | 124.0 |
| Cobalt linoleate solution (0.75%) | 2.7 |
| Total solids | 44.6% |
| Viscosity (Gardner-Holdt scale) | A |

A lacquer made from the resin of the preceding example is as follows:

*Example VII*

| | Parts by weight |
|---|---|
| Resin of Example V | 40.0 |
| Nitrocellulose (0.5 sec.) | 10.0 |
| Hi-flash naphtha | 26.6 |
| Butyl acetate | 22.8 |
| Ethyl acetate | 24.0 |
| Butyl alcohol | 10.0 |
| Ethyl alcohol | 12.7 |
| Toluol | 55.0 |
| Cellosolve acetate | 2.6 |
| Aliphatic hydrocarbon mixture | 9.3 |

The ratio of resin to pyroxylin in the above composition is 4:1, the total solids 23.5%, and the viscosity 19.2 seconds at 77° F. in a No. 10 cup.

The best compatibility of my mixed resinous esters in pyroxylin lacquers and enamels is usually found within the range of 2:1 to 1:4 by weight of pyroxylin to resin. The improved protective coatings disclosed herein may contain the usual driers, antioxidants, plasticizers, pigments and solvents. The conventional methods of applying compositions of a similar nature, such as spraying, brushing, baking, air drying, etc. may be used.

Other organic solvents such as methoxyethanol, ethoxyethanol, xylene, ethylene dichloride, acetone, ethyl lactate, etc., with or without diluents such as aliphatic hydrocarbons (e. g. mineral thinner) may be used.

In addition to the manufacture of protective coatings, such as varnishes, lacquers, and enamels (with or without cellulose derivatives), my new resinous esters are useful in the preparation of molding compositions, with or without the addition of fillers, pigments, dyes, etc.; impregnating agents for paper, felt, cloth, wood pulp, and porous materials of all kinds; binders; adhesives; cements; sizing materials; and laminated products.

As many apparently widely different embodiments of this invention may be made without departing from the spirit and scope thereof, it is to be understood that I do not limit myself to the specific embodiments thereof except as defined in the following claims.

I claim:

1. A resinous mixed ester of a polyhydric alcohol with a mixture of acids comprising a hydrogenated acidic gum and a fatty oil acid.

2. A resinous mixed ester of a polyhydric alcohol with a mixture of acids comprising a hydrogenated acidic gum and an organic polybasic acid.

3. A resinous mixed ester of a polyhydric alcohol with a mixture of acids comprising a hydrogenated acidic gum, an organic monobasic acid and an organic polybasic acid.

4. A process which comprises esterifying a polyhydric alcohol with a mixture of organic acids comprising a hydrogenated acidic gum and fatty oil acid.

5. A process which comprises esterifying a polyhydric alcohol with a mixture of organic acids comprising a hydrogenated acidic gum and an organic polybasic acid.

6. A process which comprises heating a polyhydric alcohol with a fatty oil and thereafter heating with a mixture of acids comprising a hydrogenated acidic gum.

7. A process which comprises heating a polyhydric alcohol with a fatty oil and thereafter heating with a mixture of acids comprising a hydrogenated acidic gum and an organic polybasic acid.

8. A coating composition comprising a cellulose derivative and a solution in an organic solvent of a mixed resinous ester of a polyhydric alcohol with a mixture of acids comprising a hydrogenated acidic gum.

9. A coating composition comprising a cellulose derivative and a solution in an organic solvent of a mixed resinous ester of a polyhydric alcohol with a mixture of acids comprising a hydrogenated acidic gum and an organic polybasic acid.

10. A coating composition comprising a cellulose derivative and a solution in an organic solvent of a mixed resinous ester of a polyhydric alcohol with a mixture of acids comprising a hydrogenated acidic gum, an organic polybasic acid and an organic monobasic acid.

11. A coating composition comprising a solution in an organic solvent of a cellulose derivative and a mixed resinous ester of glycerol with a mixture of acids comprising a hydrogenated acidic gum, phthalic acid and a drying oil acid.

ROGER ADAMS.